United States Patent [19]

Leeds

[11] Patent Number: 4,490,201
[45] Date of Patent: Dec. 25, 1984

[54] METHOD OF FABRICATING CARBON COMPOSITES

[75] Inventor: Donald H. Leeds, Rolling Hills, Calif.

[73] Assignee: The B. F. Goodrich Company, Akron, Ohio

[21] Appl. No.: 291,309

[22] Filed: Aug. 10, 1981

[51] Int. Cl.$^3$ ............................................. B32B 31/20
[52] U.S. Cl. ................................... 156/155; 156/256; 156/307.3; 156/330; 156/330.9; 156/335; 156/336; 264/29.5; 264/29.6; 264/29.7; 423/447.1; 423/447.2; 423/447.4; 427/228; 427/249; 428/262; 428/287; 428/408; 428/902
[58] Field of Search ...................... 156/155, 307.3, 256, 156/330, 330.9, 335, 336; 423/447.1, 447.2, 447.4; 264/29.1, 29.5, 29.6, 29.7; 427/228, 249; 428/196, 198, 260, 262, 280, 287, 288, 289, 408, 902

[56] References Cited

U.S. PATENT DOCUMENTS 4,029,829  5/1977  Weaver et al. ................. 427/249 X
4,234,650  11/1980  Schieber ........................ 264/29.7 X Primary Examiner—Robert A. Dawson
Attorney, Agent, or Firm—James E. Brunton

[57] ABSTRACT

An improved method of making a carbon composite product wherein a fabric comprised of oxidized or otherwise stabilized polyacrylonitrile fibers is heat treated and then coated with a closely controlled amount of a carbonaceous binder such as a polyimide resin. The fabric is then further heat treated to thermally fuse the resin to the fabric to form a rigid, easily handleable material. The carbonaceous binder is applied to the fabric in a manner whereby substantial encapsulation of the individual fibers is avoided. Next the material is cut into swatches of a predetermined size and shape and the segments are arranged into a basic or starting substrate having a volume greater than the desired volume of the end product. The basic substrate thus formed is then subjected to controlled temperatures and pressures to form a shaped substrate having a known fiber volume, a high degree of open porosity and a shape substantially corresponding to the shape desired of the end product. During this step, the fiber volume of the substrate is adjusted and the segments are fused together to temporarily hold them in position within the substrate. The shaped substrate thus formed is then pyrolyzed to form a carbon fibrous substrate which is densified in a free-standing configuration by the deposition of pyrolytic carbon interstitially thereof to form the desired end product. Because the portions of the fibers which are not encapsulated with binder are free to move, stresses generated in the substrate during pyrolyzation due to material shrinkage and the like are effectively distributed.

10 Claims, 4 Drawing Figures

METHOD OF FABRICATING CARBON COMPOSITES

BACKGROUND OF THE INVENTION

1. Field of the Invention

This invention relates generally to methods of making carbon composite articles. More particularly, the invention relates to a novel process wherein a porous, rigidized shaped substrate, or preform, is constructed from layers of an interwoven fibrous fabric material which has been heat treated and onto the fibers of which has been thermally fused a very small amount of a carbonaceous binder. To complete the composite product, the substrate is subjected to controlled conditions of temperature and pressure and then is controllably densified by the chemical vapor deposition of pyrolytic material interstitially thereof.

2. Discussion of the Prior Art

Excellent high temperature performance characteristics of carbon composites in structural, frictional, ablative and thermal insulation applications has caused an ever expanding demand for such materials. Accordingly considerable effort has been extended in recent years in developing new techniques for the large scale production of such materials for use in nuclear, aerospace, aircraft and industrial fields.

In producing carbon composite products, substrates or preforms, made up of carbon fibrous materials are first constructed. Two basic methods are typically employed to produce the substrates. In accordance with one method, sometimes called the resin bonding method, the fibrous substrate materials are bonded together using substantial amounts of carbonizable binder such as phenolic resin or the like. The methods described in the patent to Bickerdike et al, U.S. Pat. No. 3,233,014 is exemplary of the resin bonding method. In accordance with the second method, often called the Chemical Vapor Deposition or C.V.D. method, the fibrous substrate materials are bonded together by the interstitial deposition of pyrolytic carbon using known chemical vapor deposition (C.V.D.) techniques. The patent to Bauer, U.S. Pat. No. 3,895,084, clearly describes the C.V.D. method. Also pertinent to this method is the British patent to Williams, U.S. Pat. No. 1,455,891.

The resin, or carbonaceous binder method has certain recognized advantages. For example, using this method, durable, high density structurally stable preforms can readily be produced using conventional molding and press bonding techniques. The preforms formed by this method can conveniently be shaped and are easily handleable. Drawbacks of the resin binder method, however, include the fact that the method is relatively expensive requiring several preparatory processing steps including pre-impregnation of the substrate materials, "B" staging and binder carbonization. Additionally, difficulties have been experienced using this method in achieving acceptable compatability between fiber and binder processing shrinkages, and in routinely producing preforms which retain acceptable part integrity during the various substrate processing steps without delaminating or micro-cracking. In a similar vein, the relatively high quantities of carbonizable binder necessary to produce an acceptable carbonizable substrate frequently pose debulking, outgassing and dimensional stability problems during carbonization of the binder. A frequent objective of the resin bonding method is to totally encapsulate the individual fibers of the substrate in an attempt to eliminate undesirable voids in the substrate.

The C.V.D. method, wherein substrate bonding is accomplished by depositing onto the fibers of the substrate carbon resulting from dissociating methane or other carbon bearing source gasses, also has several recognized advantages. For example, this technique produces a substrate having maximum open porosity so as to permit precisely controllably partial or complete substrate densification. Additionally, inherent in the method is the fact that each fiber of the substrate is uniformly coated with the deposited material rendering it substantially impermeable and unusually resistant to corrosion even at high temperatures. Further, the thickness of the coating on the fibers themselves and at the fiber cross-over points can be precisely regulated so as to achieve the desired substrate rigidity.

A major disadvantage of the C.V.D. method is that some form of expensive and often bulky shaping fixture is required to hold the substrate materials in the desired configuration until sufficient pyrolytic carbon has been deposited to rigidize the fibrous structure. Such hardware is expensive, reduces furnace productivity substantially since it occupies a significant portion of the severely limited furnace processing volume, and presents significant assembly and disassembly problems.

As will become apparent from the discussion which follows, the method of the present invention permits realization of the advantages of both the resin and C.V.D. methods while substantially avoiding the disadvantages of each method.

A method devised to attempt to overcome the problem of clogging the intersticies of the substrate with resin is described in co-pending U.S. application Ser. No. 047,158, now abandoned, wherein the present inventor is named as a co-inventor. The drawbacks of the method described in said application relate to difficulties encountered in precisely controlling the amount of resin used as a temporary bonding agent and in handling the fabrics to which the resin is applied. In the process of the previously described invention the resin impregnated fabric is fragile and difficult to handle and cut. Additionally, during handling, the resin applied to the material tends to powder and spall making precise control of the amount of resin contained in the shaped substrate impossible. The method of the present application uniquely and effectively solves this problem in a way which enables large volume production of the starting substrate material.

In addition to the prior art identified in the preceeding paragraphs, applicant is aware of a printed publication entitled "Development of High Modulus Carbon Fiber Tape Composites" published by United Technology Laboratories which describes methods of making composite articles using carbon fiber tape.

SUMMARY OF THE INVENTION

It is an object of the present invention to provide a novel method of making a carbon composite product in which a precursor substrate is constructed from interwoven oxidized, stabilized PAN fibers which have been coated with a very small amount of binder such as a polyimide resin. The precursor substrate is then compressed under controlled conditions of temperature and pressure to form a shaped substrate, the individual fibers of which are temporarily bonded together. Due to the small amount of resin used, the intersticies of the shaped substrate remain open to permit free interstitial deposition of a pyrolytic material which permanently bonds the fibers together to form a rigid article of known density.

It is another object of the invention to provide a method of the aforementioned character in which the fibers of the shaped substrate are sufficiently bonded together to permit the substrate to be freely handled during the pyrolization and densification steps of the process without the need for holding fixtures or other means of constraining the shape of the substrate.

Another object of the invention is to provide a method as described in the preceeding paragraphs in which substantial encapsulation of the fibers within the binder material is carefully avoided so that the portions of the individual fibers are free to move to accommodate and distribute stresses generated within the substrate due to material shrinkage and other process related causes.

It is another object of the invention to provide a novel method for the construction of shaped substrates of the class described in which various carbonaceous binder materials can be used including polysacharides and phenolic, polyimide, polyamide, furfural or pitch resins.

It is yet another object of the invention to provide a method of the character described in the preceeding paragraphs in which the carbonaceous binder material is safely carbonized during the densification step thereby eliminating the need for a special binder carbonization step.

It is a further object of the invention to provide a method of the aforementioned character in which partially carbonized, fully carbonized, or graphitized fibrous substrate materials can be used without the necessity of matching volumetric shrinkages of the fibers and carbonaceous binders to achieve acceptable precurser substrates.

Another object of the invention is to provide a method of making carbon composites in which, by carefully controlling the amount of binding material used to coat the fibers of the starting material, the binder will not adversely effect the densification process, nor will it result in structural defects in the finished article.

A further object of the invention is to provide a method of making carbon composites in which the binding material may be precisely deposited in known amounts onto the fibers of the fabric material in liquid or particulate form.

Still another object of the invention is to provide a method of making carbon composites in which the resin can be thermally fused to the fibers of the starting material in a cost effective, continuous, or semi-continuous process thereby enabling high volume production of carbon composite articles of precise shape, density and fiber volume.

Another object of the invention is to provide a method of making carbon composites in which the resin applied to the starting fabric is thermally fused to the fibers thereof to rigidize the fabric and make it easy to handle and to form into segments of precise weight and dimension.

Finally it is an object to provide a final composite article of the aforementioned character having superior mechanical properties including high interlaminer shear strength, high edge flex strength and high flat flex strength after full CVD densification.

In summary, these and other objects of the invention are achieved by a novel method comprising the steps of heat treating a two dimensional agglomeration of stabilized PAN fibers; coating the fibers with a predetermined amount of carbonaceous binder; further heat treating the material thus formed to thermally fuse the binder to the individual fibers; cutting the treated agglomeration of fibers (woven into fabric or nonwoven into mats) into segments of a predetermined size and shape; arranging the segments into a basic substrate having a volume greater than the volume of the end product; compressing the basic substrate at a temperature of between approximately 300° F. and approximately 410° F. into a shaped substrate having a known volume and a shape substantially corresponding to the shape desired of the end product; pyrolyzing the shaped substrate to form a carbon fibrous substrate; and maintaining the carbon fibrous substrate in the presence of a carbonaceous gas at a temperature of between approximately 1900° F. and approximately 2300° F. to deposit pyrolytic carbon interstitially in said carbon fibrous substrate.

DESCRIPTION OF THE PREFERRED EMBODIMENTS

Figure 1:
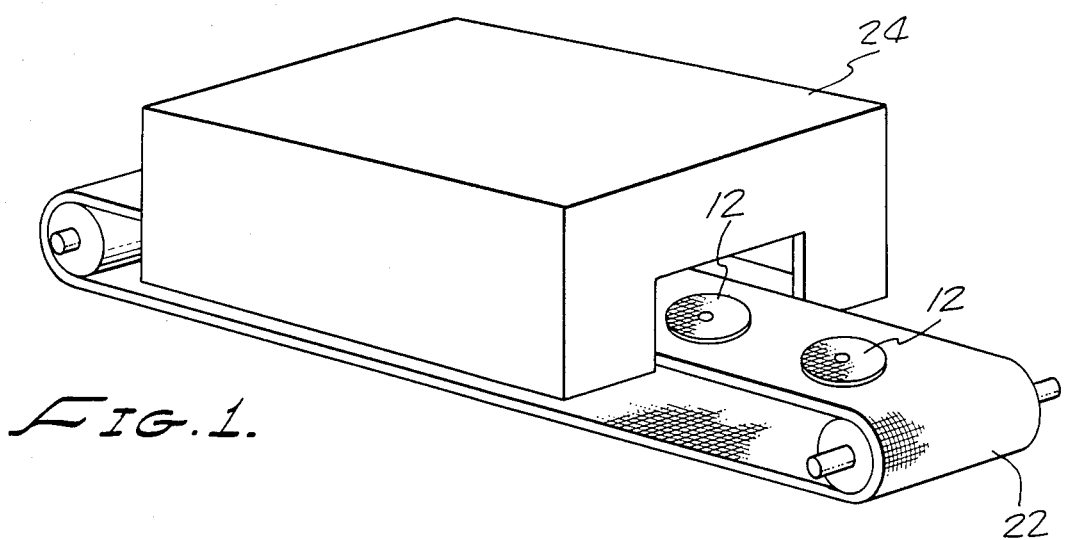
FIG. 1 is a perspective view illustrating the method of thermally fusing the carbonaceous binder material onto the fibers of the shaped segments used to construct the basic substrate.

Before proceeding with a detailed discussion of the preferred embodiments of the present invention, the following definitions of the technical terms used herein are presented to facilitate a clear understanding of the nature and scope of the invention:

1. Carbon composite product—a product consisting of a fibrous material, the fibers of which are intertwined in woven (fabrics) and non-woven (mats) and are oxidized stabilized, partially carbonized, fully carbonized or graphitized, a carbonaceous binder material and a pyrolytic material deposited interstitially of the fibrous material.
2. Basic or precursor substrate—as used herein, the starting substrate or interim product shape before compressing the substrate into a shaped substrate.
3. Shaped substrate or preform—the pressed or formed basic substrate suitable for pyrolysis or densification with pyrolytic material.
4. Carbon fibrous substrate—the shaped substrate after pyrolysis ideally suited for interstitial deposition of pyrolytic carbon or a similar material.
5. Carbon fiber—carbon material in fibrous form.
6. Carbonaceous binder—a material adapted to be thermally fused to the fibers of the woven starting material at selected bonding sites without encapsulating a substantial portion of the fiber. Various resin materials including thermoplastic resins have proven satisfactory as the binder material.

7. Pyrolytic material—the material formed by pyrolysis, that is chemical decomposition by heat. Various pyrolytic materials may be used in the densification step such as pyrolytic carbon, certain nitrides such as boron nitride, certain refractory metals such as tantalum, tungsten, molybdenum and columbium, as well as certain carbides including tantalum carbide, niobium carbide, zirconium carbide, hafnium carbide and silicon carbide.

8. Carbonaceous gas—a carbon containing gas.

9. Polyacrylonitrile (PAN) fibers—synthetic polymeric fibers.

10. Oxidized, or otherwise stabilized polyacrylonitrile fibers—black fibers formed by suitable oxidation or other chemical modification of polyacrylonitrile fibers under tension.

11. Fiber volume—volume of fibers present in the given substrate.

12. Woven—fabric formed by interlacing warp and filling threads on a loom, or the like.

13. Swatch—piece of woven or non-woven material used in manufacturing as a unit.

As will be clearly illustrated by the examples which follow, the method of the invention stated in simple terms comprises the following steps: First, a starting material in the form of intertwined PAN, rayon or wool fibers is heat treated to about 1600° C. Next, a small quantity of a suitable carbonaceous binder such as phenolic resin, polyimide resin, or a like material is applied to a selected carbon fibrous material. The binder can be applied to the material by hand sprinkling, through use of a roller brush, by surface spraying, or by other similar means. Next, the coated starting material is exposed to elevated temperatures for a controlled period of time to thermally fuse the resin to portions of the individual fibers. This is done in such a manner as to avoid total encapsulation of the fibers. The material thus formed, which is rigidized and easy to handle, is then assembled into a basic or starting substrate having a volume greater than the volume of the end product. The basic substrate is then subjected to controlled temperatures and pressures to form a shaped substrate which has a high degree of open porosity, a known volume and a shape substantially corresponding to the shape of the desired end product. During this "press bonding" step the individual fibers of the carbon fibrous material are selectively bonded together by the binder material at multiple sites. These bonds or "tacks" rigidize the substrate so that during the subsequent processing steps it can be readily handled in a free standing configuration. Finally, the shaped substrate or preform is partially, or fully densified in a freestanding configuration by chemical vapor deposition of selected pyrolytic materials interstitially of the substrate. The various pyrolytic materials which may be used are set forth in the examples which follow.

Depending upon the particular starting material and binder used, an interim carbonization step may be required. This carbonization step preceeds the densification step and functions to controllably carbonize the binder and, in some instances, the fibers which make up the basic substrate. Additionally, for some applications either an interim or final heat treating step is undertaken.

Referring to the drawings, and particularly to FIG. 1, the method of the present invention comprises the steps of first cutting a carbon fibrous fabric material having a multiplicity of intertwined fibers into pieces having a predetermined size and shape. The material may be constructed from fibers of wool, rayon, polyacrylonitrile (PAN) or like materials and may be cut into annular shapes 12 of the character shown in FIG. 1, or into pie shaped segments, rectangles or other suitable configurations. The shape of the fabric "lay ups" is, of course, governed by the desired shape and end use of the final product being fabricated.

The next step in the method of the invention is to selectively deposit onto the fibrous material a very small quantity of a carbonaceous binder. Depending again upon the end use of the final product and the desired method of application of the binder, the carbonaceous binder material used may be a phenolic resin, a particulate polyimide resin such as "Kerimid 601" distributed by Rhodia, Inc. of New Brunswick, N.J., a furfural resin such as "Karbon 700R" distributed by Fiberite, Inc. of Winona, Minn., or various other binder materials well known to those skilled in the art.

The binder material may be diluted with a solvent such as isopropyl alcohol and then sprayed onto the fibrous material, or it may be sprinkled onto the fibrous material by hand or through the use of various types of mechanical dispensing apparatus.

Figure 2:
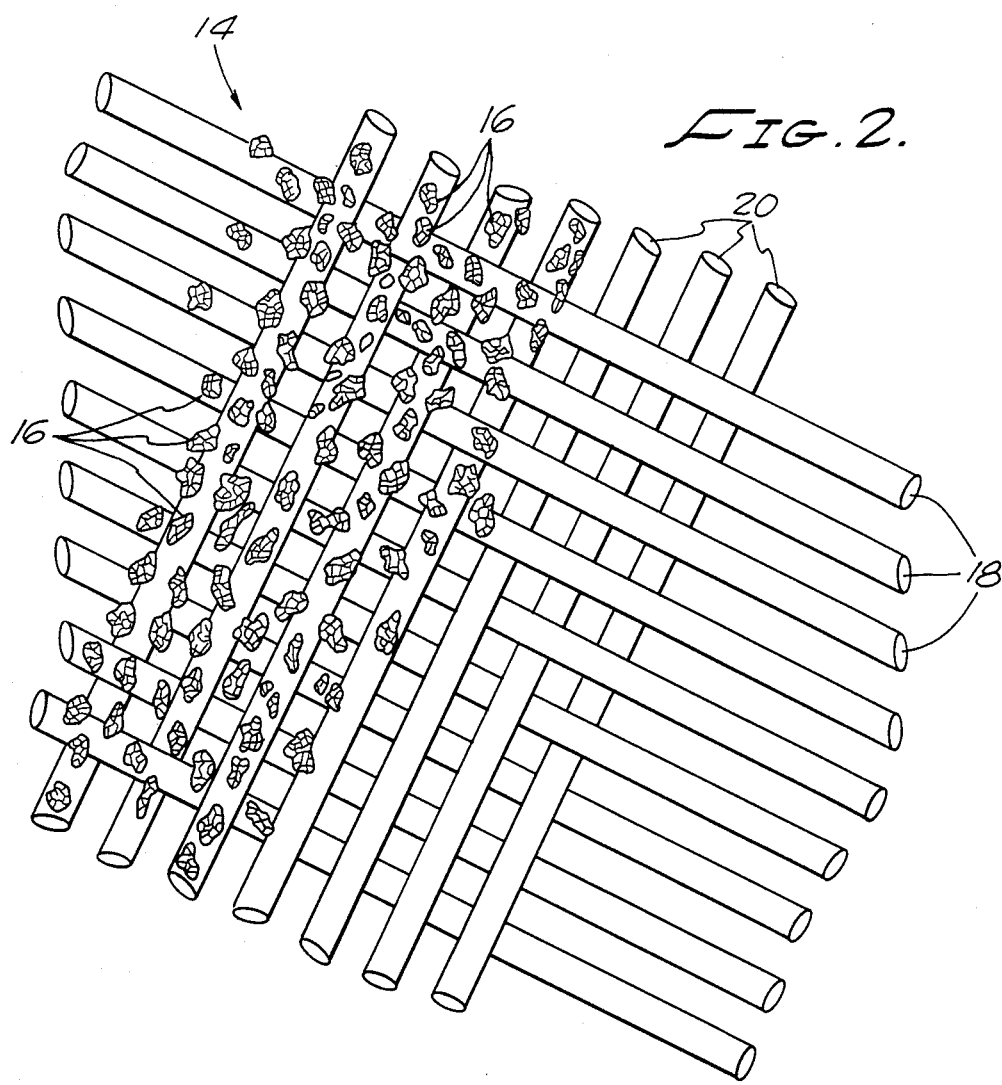
FIG. 2 is a greatly enlarged, fragmentary view of a portion of a woven fibrous material made up of warp and fill yarns onto which particles of a carbonaceous binder material have been selectively deposited.

Turning to FIG. 2, there is schematically illustrated in greatly enlarged perspective, a fabric material 14 such as PAN 8 harness satin manufactured by Stackpole Fibers, Inc. as it appears after a limited quantity of particulate binder material 16 has been deposited thereon. It is to be observed that the fabric material is made up of warp yarns 18 and fill yarns 20 which are interwoven together to form the fabric. Only a limited amount of binder is deposited on the fabric surfaces at spaced apart bonding sites along the warp and fill yarns. Great care is exercised in depositing the binder material to make certain that during subsequent heating steps, substantial encapsulation of the individual fibers will not occur. This is necessary to that the portions of the fibers which intermediate the bonding sites will be free to move to accommodate and effectively distribute stresses which may be generated during subsequent processing steps.

After depositing the carbonaceous binder onto the lay-ups 12, they are placed on a metal mesh conveyor belt 22 (FIG. 1) and are passed through a temperature controlled oven 24 at a fixed rate of speed. Oven 24 is of standard construction and may be heated electrically or by natural gas. The oven temperature and the speed of travel of the conveyor belt is, of course, varied depending upon the type of binder being used and the character of the starting material. Ideally, the material is exposed to the lowest temperature possible for the minimum time necessary to thermally fuse the binder to the fibers of the lay-ups. Exemplary time-temperature ranges are set forth in the examples which follow.

For certain large volume processing applications it may be desirable to cut the starting material into long sheets or ribbons, coat the material with the binder in the manner previously discussed and then continuously pass the material through the oven at a controlled rate of speed. The material thus formed can then be automatically cut into segments of a desired size and shape for further processing.

Figure 3:
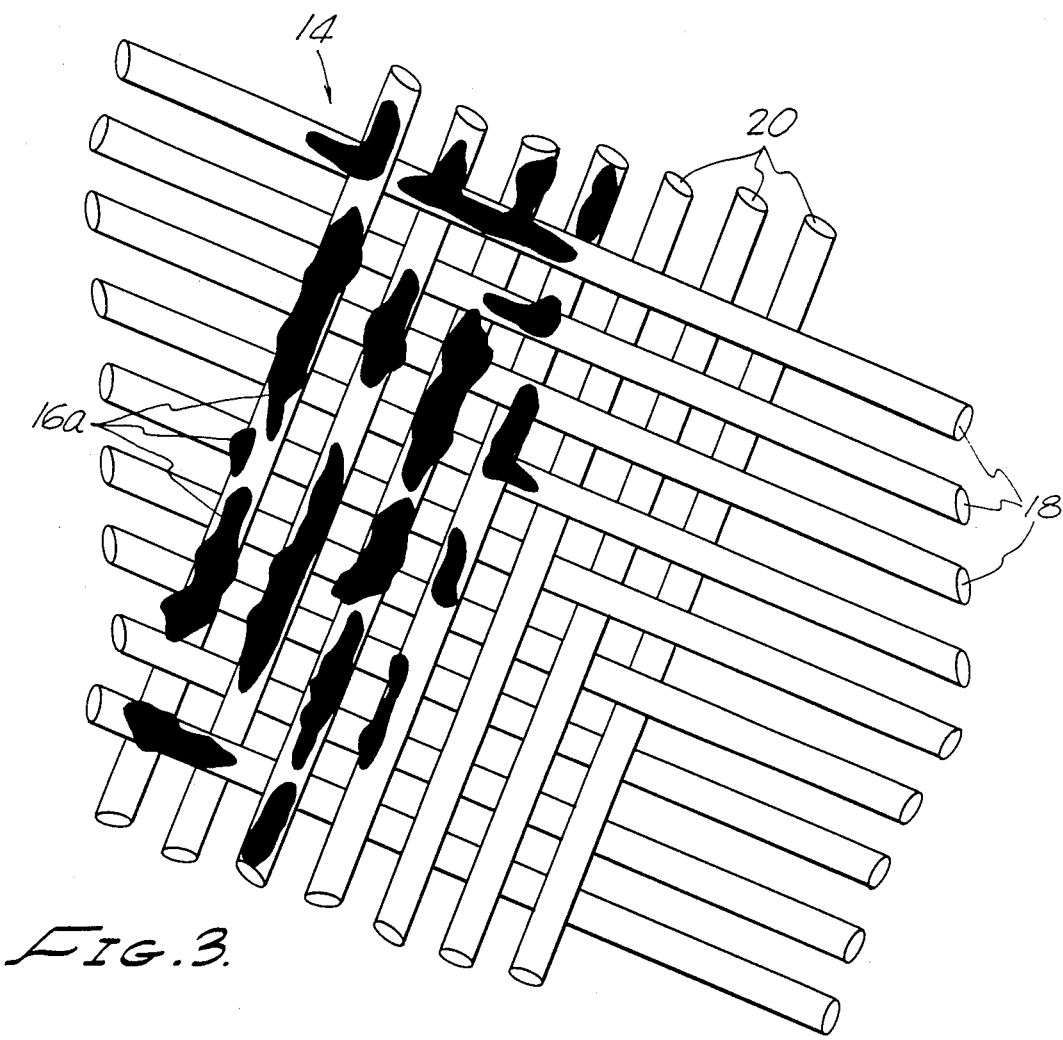
FIG. 3 is a greatly enlarged, fragmentary view of the portion of material shown in FIG. 2 illustrating its appearance after the material has been processed through the oven processing step illustrated in FIG. 1 wherein the binder material is thermally fused to the individual fibers of the shaped segments.

The appearance of the material after oven processing is illustrated in FIG. 3. As there shown the carbonaceous binder 16 has become thermally fused to the upper surfaces of the fibers at locations intermittent their length. After fusion the binder takes on a smooth glassy like appearance as indicated by the numeral 16a in FIG. 3. Importantly, none of the fibers have been totally encapsulated with the fused binder so that portions of the fibers will be free to move to accommodate stresses generated within the material during subsequent processing. This approach is, of course, in direct contradistinction to the teaching of the prior art wherein complete encapsulation of the yarns of the fabric is deemed highly desirable in the fabrication of composite articles.

The coated fabric formed by the oven processing step is ideally suited for further processing. It is quite rigid and can be readily cut, shaped and easily transported. Also of significant importance is that the coated fabric exhibits no spalling or flaking of the binder material during handling. Accordingly, the amount of binder present in the finished article can be precisely determined and accurately controlled. This critical feature of the method of the present invention was unattainable in the previously devised methods discussed in the application earlier filed by applicant.

Figure 4:
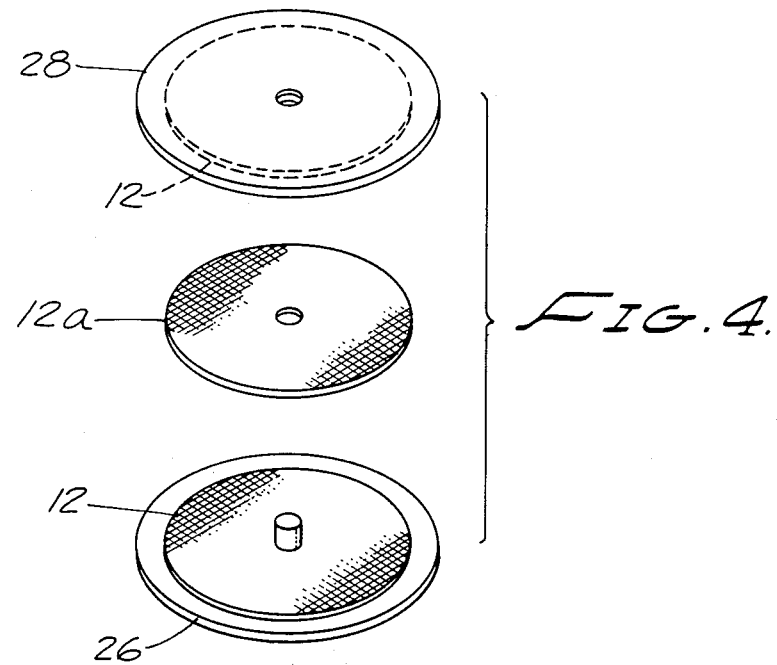
FIG. 4 is a perspective, exploded view illustrating the method of assembly of the coated swatches onto pressing plates used in the construction of the basic substrate.

Referring now to FIG. 4, the next step in the method of the invention is to construct a basic substrate from the lay-ups 12 upon which the binder material has been thermally fused. In the form of the invention shown in FIG. 1 this is accomplished by first placing a lay-up 12 onto a large metal plate 26. Lay-up or disc 12 is free of binder material so as to facilitate separation of the substrate from the plate 26. Subsequent discs designated as 12a in FIG. 4, upon which the binder has been thermally fused, are then placed over disc 12 in a predetermined orientation, with a rotational offset from the preceeding layer. After a predetermined number of layers of the coated fabric material have been assembled, a second binder free disc 12 is placed over the upper most piece of material and a second metal plate 28 is placed on top of the assembly.

The basic substrate thus formed, along with the metal plates 26 and 28, are placed into a press which is provided with heated press platens. The press and press platens used in the forming of the spaced substrate is of standard design and its construction and operation need not be described in detail herein.

The basic substrate is carefully constructed so that it has a volume greater than the desired volume of the final product, has a known fiber volume and contains a predetermined, limited amount of binder material. The actual fiber volumes and binder weight percent ranges used in the practice of the invention are illustrated in the examples which follow.

In forming the shaped substrate, the basic substrate is subjected to controllable external pressures of up to 5000 psi at predetermined temperature ranges of up to several hundred degrees Fahrenheit. The shaped substrate formed in accordance with the methods of the invention has a known volume, a known fiber volume, and has a shape substantially corresponding to the shape desired of the final product. The various temperature and pressure ranges actually used in the shaping step are illustrated in the examples which follow and are selected so as to controllably compress the basic substrate a predetermined amount and to cause the individual fibers thereof to be bonded together at the multiplicity of spaced apart bonding sites.

Following the shaping step, the shaped substrate is removed from the metal plates and is placed in a free-standing configuration into a vacuum deposition furnace for densification with a selected pyrolytic material such as pyrolytic carbon. The densification is accomplished by well known chemical vapor deposition (CVD) techniques. The various temperature and pressure ranges suitable for the CVD densification step are set forth in the previously identified British Pat. No. 1,455,891.

Because the fibers of the shaped substrate are selectively bonded together by the binder material at a multiplicity of spaced apart bonding sites, the shaped substrate is suitably rigid to retain its shape during the densification step without the necessity of using bulky holding fixtures to constrain it in the desired configuration. This permits maximum use of valuable furnace space and constitutes a significant cost saving over typical prior art furnace processing methods. Additionally, and most importantly, because the individual fibers are not encapsulated in the binder material, the portions thereof which are disposed intermediate the bonding sites are free to flex and move to accommodate and distribute external stresses. Accordingly, no special matching of the binder matrix to fiber volumetric shrinkages is required to produce defect free fully or partially densified end products. Such a unique and important result is nowhere described nor suggested in the prior art.

During the CVD densification step, the binder material within the shaped substrate is fully carbonized. Simultaneously, the transient binder material fibers bonds are augmented by permanent fibers bonds formed by the pyrolytic material which has been deposited interstitially of the substrate.

Examples Illustrating Several Methods of the Invention

EXAMPLE NO. 1

A sample of woven fabric 44 inches wide by 22 inches long was heat treated at about 1600° C. in a manner well known to those skilled in the art. After heat treatment, an even thickness dry coating containing 28 weight percent of powdered polyimide resin was applied to one surface of the panel. The resin used was Kerimid resin type 601 available from Rhone-Poulenc, Inc., Chemical Division, Monmouth Junction, N.J. 08852. The resin was applied by using two standard paint rollers, attached such that one roller led to the second roller (in tandem). This type of applicator was used in order to precisely control the amount of resin to be applied. The content of resin applied ranged from 25 percent to 30 percent by weight.

The coated panel was then placed onto the conveyor belt of the oven unit and was passed through the oven at a rate of approximately one half to five feet per second. During oven processing of the panel, the temperature of the oven was maintained at between 100° C. and 150° C.

Following the oven processing step, which formed a semi-continuous glassy-like resin coating on the upper surface of the cloth, the coated panel was cut into $4\frac{1}{4}$ inches by $4\frac{1}{4}$ inches swatches. The fusion of the resin onto the fabric greatly improved the handling characteristics of the material and no spalling or flaking of resin was observed. This minimized inhalation hazards and made precise control of resin content possible. The cut swatches were then superimposed upon one another in 0° to 90° layup, alternating coated and uncoated surfaces, since the material had resin on only one side.

Following lay-up, the preform was warm pressed to stops, which controlled thickness and fiber volume, at 225° F. for 30 minutes. After this, temperature was increased to 350° F. and held for 60 minutes. After the 350° F. cycle, the power was turned off, water cooling to the platens was turned on, and the part was allowed overnight to cool. The 4¼ inch by 4¼ inch by 0.550 composite was removed from the press. The shaped substrate thus formed was well bonded, i.e., the edges could not be separated by gentle thumb abrasion.

Following the shaped substrate fabrication, the substrate was placed into a chemical vapor deposition apparatus and was controllably infiltrated with pyrolytic carbon. Fiber volume of the finished part was held to within 20 percent of that of the preform, i.e., the organic binder held through thermal processing to achieve the inorganic carbon binding. Calculated resin char content in the final discs was 2 to 3 percent by weight. This great reduction in content from 25 to 30 percent starting content is due to the poor char yield (by design) and the fact that the primary bond is the pyrolytic carbon which is added subsequently.

EXAMPLE NO. 2

Rayon precurser 8 H/S fabric was processed in the same manner as the fabric described in Example No. 1. The coated rayon fabric exhibited excellent handling characteristics and could be cut quite easily. No spalling or flaking of the resin was observed during cutting.

EXAMPLE NO. 3

Panels of fully carbonized 8 Harness Satin (8 H/S) PAN fabric were cut into several 11.30 inch circular discs. Binder material in the form of a furane resin distributed by Fiberite, Inc. was diluted with isopropyl alcohol in a 3:1 ratio for application. The resin solvent mixture was then sprayed on one side of each disc using a standard type of spray gun. The discs were then air dried for 24 hours at ambient temperature. Next, the discs were reweighed and the extent of resin pick-up was determined. Nominal resin pick-ups by weight were found to be about 3.0 percent. This was increased to 10 percent by subsequent spray coatings.

Each coated disc was then cut into 45° segments having an outside diameter (OD) of 10.30 inches and an inside diameter (ID) of 3.84 inches. Segments were laid up on a large plate having a graphite center "spud" or post. Each subsequent layer (8 segment group) was rotationally offset from the preceeding layer.

The fabric assemblies or basic substrates were compressed using a 350 ton press provided with heated platens. Press platens were heated to 250° F., materials were inserted, and the press was closed. Platen temperatures were maintained at 250° F. until thermocouples disposed within the material indicated that a temperature of 250° F. had been reached within the substrate. Platen temperatures and the material temperature were then increased to 350° F. The material was held at 350° F. for 10 minutes and then cooled down over a period of one hour. Pressure on the parts was maintained at approximately 350 pounds per square inch (PSI) throughout the pressing cycle.

Rigidized preforms, or shaped substrates, were obtained. Fiber volumes associated with the PAN 8 H/S preforms were about 27.9 percent. Preform density levels were about 0.531 grams per cubic centimeter (gm/cc). The amount of binding material contained in the shaped substrates ranged from about 10 weight percent to about 15 weight percent. Preform quality as determined both visually and by x-ray analysis was excellent. No delaminating or microcracking was observed.

The shaped substrate was then subjected to a CVD processing cycle where resin carbonization, additional fiber bonding, and preform densification were achieved simultaneously. Dimensional changes, OD and ID, were minimal (0.04 to 2.2 percent). Major thickness expansion did, however, occur. Corresponding fiber volume (reduction) was about 20.4 percent. Calculated resin char content by weight was about 1 to 2 percent after final CVD. Densified preform (composite) quality was excellent. No delamination or macrocracking was observed. Thus, the major changes in thickness and fiber volumes observed were successfully accommodated without structural degradation. A high degree of substrate open porosity was maintained and uniformaly increased.

Additionally CVD processing resulted in a final product, carbon/carbon composite with a density of about 1.75 gms/cc. Final composite quality was excellent (structurally sound) and mechanical property levels were highly acceptable.

EXAMPLE NO. 4

Full graphitized (rayon precursor) graphite 8 H/S fabric was processed in example the same manner as were the PAN fabrics described in Example No. 1. Resin content, however, was about 35 percent by weight and the discs were exposed to oven temperature for a total time of about 4 to 5 seconds.

After coating, the rayon discs were substantially more rigid and exhibited excellent handling characteristics. The assembly of the discs onto the plates of the fixture was accomplished with no spalling or flaking of the resin being observed.

Fiber volume of the finished article was measured and was found to be within 20 percent of that of the shaped substrate.

Calculated resin char content was about 3.5 percent by weight in the final disc after infiltration by CVD.

EXAMPLE NO. 5

A compressible non-woven carbonized pitch felt (mat) fibrous material was processed in the exact manner as was the PAN fabric described in Example No. 3.

A furane resin distributed by Fiberite, Inc. was used and the resin content was limited to about 15 percent by weight and the discs were exposed to oven temperature for about 2 hours. Calculated resin char content was about 2 percent by weight in the final disc after infiltration by CVD.

EXAMPLE NO. 6

A PAN woven fabric was processed in the exact manner as the rayon fabric described in Example No. 4 except that a furane resin distributed by Fiberite, Inc. was used and the resin content was limited to about 20 percent by weight. Calculated resin char content in the final disc was, again, about 2 percent.

EXAMPLE NO. 7

Carbonized PAN chopped fibers were suction deposited on a screen from a solution containing a liquid starch (polysaccharide) binder prepared by Purex Corp., Carson, Calif. Enough residue from the initial solution was left on the fibers so that when they were dried in a press under 2 to 5 tons pressure in discs twelve inches in diameter, the starch binder set and held the discs in debulked condition through CVD bonding. Final product calculated starch char carbon content was only 1 to 2 percent by weight.

EXAMPLE NO. 8

A compressible non-woven carbonized pitch felt (mat) fibrous material was processed in the exact manner as was the PAN fabric described in Example No. 3.

A phenolic resin of a common type which is readily commercially available was used and the resin content was limited to about 15 percent by weight and the discs were exposed to oven temperature for about 2 hours. Calculated resin char content was about 2 percent by weight in the final disc after infiltration by CVD.

EXAMPLE NO. 9

A compressible non-woven carbonized pitch felt (mat) fibrous material was processed in the exact manner as was the PAN fabric described in Example No. 3.

An epoxy novalac of a common type which is readily commercially available was used and the resin content was limited to about 15 percent by weight and the discs were exposed to oven temperature for about 2 hours. Calculated resin char content was about 2 percent by weight in the final disc after infiltration by CVD.

EXAMPLE NO. 10

A compressible non-woven carbonized pitch felt (mat) fibrous material was processed in the exact manner as was the PAN fabric described in Example No. 3.

An epoxy novalac/polyimide mix was used and the resin content was limited to about 15 percent by weight and the discs were exposed to oven temperature for about 2 hours. Calculated resin char content was about 2 percent by weight in the final disc after infiltration by CVD.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A method of making a carbon composite product comprising the steps of:
   (a) selectively depositing a precisely determined, limited amount of a carbonaceous binder material onto a compressible fibrous material;
   (b) subjecting said material and binder material to an elevated temperature of about 110° C. for a time period of about 3 seconds to thermally fuse said binder material to the fibers of said material intermittently of the length of said fibers to form a coated material;
   (c) cutting said coated material into swatches of a predetermined size and shape;
   (d) constructing said swatches into a basic substrate having a volume greater than the volume of the final product;
   (e) subjecting said basic substrate to controllable external pressures of up to 5000 psi at a predetermined elevated temperature necessary to thermally fuse said binder material to the fibers of said material to compress said basic substrate into a shaped substrate having a known volume and a shape substantially corresponding to the shape desired of the final product, whereby said fibers are bonded together at a multiplicity of spaced apart bonding sites being free to move in response to stresses imparted to said shaped substrate, said shaped substrate thus formed being rigid, easily handleable and transportable and being capable of further processing without the need for holding fixtures or other means of external support;
   (f) subjecting said shaped substrate in a free standing configuration to elevated temperatures while controllably depositing pyrolytic material interstitially thereof, whereby said carbonaceous binder material is carbonized and said fibers are permanently bonded together by said pyrolytic material; and
   (g) continuing said interstitial deposition of pyrolytic material until the desired final product density is achieved.

2. A method of making a product as defined in claim 1 in which said compressible fibrous material is selected from the group consisting pitch, rayon and polyacrylonitrile fibers and in which the amount of resin char bonding material contained in said final product is between approximately 1 weight percent and approximately 5 weight percent.

3. A method of making a product as defined in claim 1 including the interim step of heat treating said shaped substrate to a temperature of approximately 1600° C. to fully carbonize, purify and provide further dimensional stability to said shaped substrate prior to depositing pyrolytic material interstitially thereof.

4. A method of making a carbon composite product comprising the steps of:
   (a) selecting a compressible fibrous material made up of fibers selected from the group consisting of pitch, rayon and polyacrylonitrile;
   (b) cutting said selected material into swatches of a predetermined size and shape;
   (c) selectively depositing a precisely determined, limited amount of a carbonaceous binder material onto the fibers of each of said swatches;
   (d) subjecting said swatches and binder material to an elevated temperature of about 100° C. and about 150° C. for a time period of about 2 to 5 seconds to thermally fuse said binder material to the fibers of said swatches intermittently of the length of said fibers to form coated swatches;
   (e) cutting said coated swatches into segments of a predetermined size and shape;
   (f) constructing said swatches into a basic substrate having a volume greater than the volume of the final product;
   (g) subjecting said basic substrate to controllable external pressures of up to 5000 psi at a predetermined elevated temperature necessary to thermally fuse said binder material to the fibers of said material to compress said basic substrate into a shaped substrate having a known volume and a shape substantially corresponding to the shape desired of the final product, whereby said fibers are bonded together at a multiplicity of spaced apart bonding sites, said fiber portions disposed intermediate said bonding sites being free to move in response to stresses imparted to said shaped substrate, said shaped substrate thus formed being rigid, easily handleable and transportable and being capable of further processing without the need for holding fixtures or other means of external support;

(h) subjecting said shaped substrate in a free standing configuration to elevated temperatures while controllably depositing pyrolytic material interstitially thereof, whereby said carbonaceous binder material is carbonized and said fibers are permanently bonded together by said pyrolytic material; and (i) continuing said interstitial deposition of pyrolytic material until the desired final product density is achieved.

5. A method of making a carbon composite product as defined in claim 4 in which the amount of binder deposited on each said swatch is between about 34 and 38 percent by weight and in which the binder is intermittently deposited on the fibers so that the portions of the fibers remained uncoated and free to move to accommodate stresses set up in the material.

6. A method of making a carbon composite product as defined in claim 4 in which the binder material is a pheonolic resin.

7. A method of making a carbon composite product as defined in claim 4 in which the binder material is a furane resin.

8. A method making a carbon composite product as defined in claim 4 in which the binder material is a polyimide resin.

9. A method of making a carbon composite product as defined in claim 4 in which the binder material is a polysaccharide.

10. A method of making a carbon composite product as defined in claim 4 in which the binder material is an epoxy resin.

* * * * *